United States Patent
Mathe

(10) Patent No.: US 8,457,396 B2
(45) Date of Patent: Jun. 4, 2013

(54) DIGITAL IMAGE COMPRESSION AND DECOMPRESSION

(75) Inventor: Zsolt Mathe, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 959 days.

(21) Appl. No.: 12/539,387

(22) Filed: Aug. 11, 2009

(65) Prior Publication Data

US 2011/0038556 A1 Feb. 17, 2011

(51) Int. Cl.
*G06K 9/00* (2006.01)
*G06K 9/36* (2006.01)

(52) U.S. Cl.
USPC .......................................... 382/166; 382/251

(58) Field of Classification Search
USPC .......... 382/162, 164, 166, 232, 245, 250–251
See application file for complete search history.

(56) References Cited

U.S. PATENT DOCUMENTS

| 7,082,218 | B2 | 7/2006 | Pollard et al. |
| 7,164,499 | B1 | 1/2007 | Gupta |
| 7,440,501 | B2 | 10/2008 | Sun et al. |
| 2001/0021276 | A1 | 9/2001 | Zhou |
| 2003/0080977 | A1 | 5/2003 | Scott et al. |
| 2006/0062478 | A1 | 3/2006 | Cetin et al. |
| 2009/0051979 | A1 | 2/2009 | Tai et al. |
| 2009/0128576 | A1 | 5/2009 | Mathe |

OTHER PUBLICATIONS

Hu, et al., "Removal of Blocking and Ringing Artifacts in Transform Coded Images", retrieved at <<http://ieeexplore.ieee.org/stamp/stamp.jsp?arnumber=00595312>>, Apr. 21-24, 1997, pp. 2565-2568.

Vaisey, et al., "Image Compression with Variable Block Size Segmentation", retrieved at <<http://ieeexplore.ieee.org/stamp/stamp.jsp?tp=&arnumber=150005&isnumber=3966>>, IEEE Transactions on Signal Processing, vol. 40, No. 8, Aug. 1992, pp. 2040-2060.

*Primary Examiner* — Duy M Dang
(74) *Attorney, Agent, or Firm* — Alleman Hall McCoy Russell & Tuttle LLP

(57) ABSTRACT

A method of compressing a digital image defined by a plurality of pixel values in each of one or more channels includes adjusting each pixel value in each of the one or more channels by an average pixel value for that channel. The method further includes splitting each adjusted channel into one or more image blocks, and converting each image block into a frequency block that is a frequency-domain representation of that image block.

14 Claims, 16 Drawing Sheets

FIG. 3A

16x16 RGB DIGITAL IMAGE

| | | | | | | | | | | | | | | | |
|---|---|---|---|---|---|---|---|---|---|---|---|---|---|---|---|
| 115 | 86 | 112 | 75 | 55 | 62 | 73 | 94 | 116 | 126 | 122 | 144 | 201 | 230 | 221 | 177 |
| 119 | 74 | 94 | 68 | 47 | 47 | 55 | 75 | 102 | 113 | 103 | 112 | 167 | 208 | 201 | 177 |
| 131 | 60 | 62 | 46 | 25 | 19 | 31 | 47 | 60 | 75 | 72 | 74 | 126 | 176 | 170 | 177 |
| 139 | 104 | 141 | 151 | 107 | 109 | 137 | 134 | 91 | 89 | 75 | 91 | 149 | 169 | 193 | 226 |
| 150 | 97 | 119 | 135 | 101 | 93 | 112 | 116 | 74 | 74 | 60 | 67 | 125 | 147 | 155 | 205 |
| 169 | 94 | 86 | 95 | 67 | 55 | 71 | 84 | 45 | 48 | 44 | 43 | 101 | 121 | 105 | 173 |
| 189 | 159 | 152 | 156 | 127 | 120 | 169 | 193 | 160 | 153 | 122 | 108 | 145 | 136 | 159 | 216 |
| 200 | 160 | 139 | 137 | 113 | 98 | 130 | 163 | 137 | 136 | 114 | 90 | 121 | 112 | 118 | 177 |
| 221 | 177 | 131 | 102 | 69 | 47 | 72 | 117 | 102 | 101 | 94 | 69 | 97 | 93 | 74 | 114 |
| 178 | 168 | 177 | 159 | 131 | 137 | 155 | 202 | 228 | 210 | 188 | 125 | 87 | 97 | 134 | 151 |
| 185 | 178 | 184 | 158 | 114 | 111 | 120 | 168 | 207 | 193 | 176 | 116 | 68 | 69 | 103 | 116 |
| 209 | 209 | 210 | 167 | 86 | 67 | 71 | 107 | 153 | 144 | 137 | 97 | 55 | 47 | 69 | 69 |
| 169 | 153 | 216 | 193 | 133 | 151 | 170 | 164 | 198 | 209 | 191 | 138 | 87 | 130 | 155 | 149 |
| 179 | 159 | 225 | 202 | 129 | 134 | 148 | 134 | 169 | 185 | 173 | 127 | 65 | 97 | 126 | 131 |
| 211 | 195 | 246 | 228 | 136 | 113 | 117 | 76 | 104 | 128 | 126 | 102 | 45 | 60 | 90 | 106 |
| 137 | 170 | 213 | 232 | 206 | 145 | 112 | 151 | 163 | 194 | 221 | 187 | 163 | 183 | 158 | 100 |
| 147 | 175 | 221 | 241 | 214 | 138 | 83 | 122 | 132 | 163 | 200 | 170 | 139 | 154 | 135 | 86 |
| 190 | 210 | 245 | 255 | 230 | 147 | 65 | 82 | 78 | 99 | 143 | 120 | 86 | 93 | 89 | 65 |
| 188 | 223 | 213 | 163 | 152 | 134 | 119 | 159 | 161 | 196 | 214 | 191 | 164 | 187 | 158 | 95 |
| 194 | 233 | 226 | 179 | 160 | 120 | 87 | 128 | 130 | 169 | 193 | 164 | 132 | 160 | 139 | 79 |
| 223 | 248 | 249 | 219 | 189 | 130 | 62 | 90 | 84 | 112 | 136 | 105 | 68 | 95 | 89 | 52 |
| 213 | 214 | 203 | 142 | 90 | 112 | 132 | 137 | 163 | 215 | 205 | 139 | 139 | 181 | 180 | 100 |
| 225 | 228 | 221 | 158 | 94 | 102 | 105 | 104 | 127 | 188 | 187 | 113 | 106 | 155 | 164 | 85 |
| 251 | 254 | 248 | 196 | 124 | 115 | 87 | 65 | 73 | 128 | 134 | 60 | 47 | 92 | 116 | 65 |
| 200 | 196 | 168 | 197 | 197 | 150 | 171 | 151 | 156 | 160 | 163 | 156 | 165 | 198 | 213 | 190 |
| 214 | 208 | 178 | 209 | 208 | 157 | 164 | 126 | 120 | 128 | 134 | 128 | 135 | 173 | 195 | 175 |
| 245 | 237 | 212 | 231 | 227 | 177 | 171 | 101 | 62 | 68 | 80 | 72 | 72 | 109 | 144 | 145 |
| 182 | 185 | 183 | 180 | 163 | 179 | 195 | 145 | 158 | 154 | 167 | 197 | 189 | 193 | 194 | 193 |
| 196 | 196 | 190 | 187 | 172 | 188 | 205 | 137 | 128 | 123 | 138 | 173 | 164 | 169 | 171 | 168 |
| 236 | 233 | 221 | 211 | 191 | 203 | 217 | 137 | 91 | 73 | 84 | 115 | 103 | 107 | 113 | 114 |
| 161 | 141 | 154 | 119 | 89 | 158 | 188 | 150 | 142 | 160 | 122 | 169 | 182 | 199 | 207 | 221 |
| 178 | 154 | 159 | 117 | 80 | 153 | 192 | 154 | 134 | 148 | 105 | 153 | 161 | 173 | 185 | 196 |
| 214 | 190 | 190 | 150 | 98 | 150 | 193 | 160 | 124 | 121 | 68 | 110 | 105 | 111 | 124 | 139 |
| 148 | 126 | 185 | 179 | 205 | 230 | 186 | 128 | 162 | 152 | 111 | 132 | 156 | 175 | 207 | 227 |
| 154 | 129 | 192 | 181 | 195 | 220 | 184 | 130 | 164 | 148 | 94 | 111 | 131 | 144 | 181 | 204 |
| 195 | 167 | 218 | 206 | 202 | 201 | 158 | 119 | 160 | 138 | 65 | 67 | 75 | 76 | 112 | 144 |
| 211 | 199 | 186 | 236 | 232 | 201 | 194 | 162 | 145 | 139 | 149 | 151 | 143 | 128 | 168 | 211 |
| 220 | 206 | 194 | 248 | 245 | 204 | 196 | 167 | 149 | 131 | 129 | 129 | 120 | 95 | 139 | 189 |
| 246 | 236 | 226 | 255 | 255 | 212 | 171 | 133 | 132 | 112 | 83 | 74 | 62 | 29 | 63 | 119 |
| 158 | 150 | 120 | 161 | 127 | 149 | 180 | 182 | 175 | 162 | 158 | 149 | 119 | 109 | 134 | 175 |
| 170 | 161 | 128 | 176 | 144 | 153 | 188 | 193 | 181 | 157 | 141 | 128 | 97 | 78 | 110 | 158 |
| 212 | 201 | 168 | 201 | 176 | 169 | 159 | 120 | 106 | 87 | 58 | 47 | 23 | 9 | 32 | 79 |
| 181 | 174 | 144 | 164 | 126 | 133 | 176 | 181 | 177 | 166 | 148 | 132 | 127 | 141 | 148 | 155 |
| 193 | 188 | 155 | 177 | 139 | 137 | 183 | 192 | 187 | 170 | 140 | 117 | 111 | 125 | 137 | 145 |
| 229 | 223 | 192 | 205 | 167 | 152 | 163 | 119 | 80 | 60 | 29 | 21 | 39 | 62 | 65 | 62 |
| 194 | 174 | 158 | 201 | 207 | 202 | 195 | 193 | 197 | 157 | 120 | 142 | 196 | 215 | 167 | 140 |
| 210 | 189 | 172 | 215 | 218 | 213 | 204 | 205 | 215 | 172 | 113 | 127 | 191 | 218 | 169 | 137 |
| 250 | 231 | 207 | 239 | 239 | 229 | 202 | 154 | 122 | 67 | 26 | 84 | 180 | 208 | 126 | 62 |

FIG. 3B

16x16 RED COLOR CHANNEL

| 115 | 86  | 112 | 75  | 55  | 62  | 73  | 94  | 116 | 126 | 122 | 144 | 201 | 230 | 221 | 177 |
|-----|-----|-----|-----|-----|-----|-----|-----|-----|-----|-----|-----|-----|-----|-----|-----|
| 139 | 104 | 141 | 151 | 107 | 109 | 137 | 134 | 91  | 89  | 75  | 91  | 149 | 169 | 193 | 226 |
| 189 | 159 | 152 | 156 | 127 | 120 | 169 | 193 | 160 | 153 | 122 | 108 | 145 | 136 | 159 | 216 |
| 178 | 168 | 177 | 159 | 131 | 137 | 155 | 202 | 228 | 210 | 188 | 125 | 87  | 97  | 134 | 151 |
| 169 | 153 | 216 | 193 | 133 | 151 | 170 | 164 | 198 | 209 | 191 | 138 | 87  | 130 | 155 | 149 |
| 137 | 170 | 213 | 232 | 206 | 145 | 112 | 151 | 163 | 194 | 221 | 187 | 163 | 183 | 158 | 100 |
| 188 | 223 | 213 | 163 | 152 | 134 | 119 | 159 | 161 | 196 | 214 | 191 | 164 | 187 | 158 | 95  |
| 213 | 214 | 203 | 142 | 90  | 112 | 132 | 137 | 163 | 215 | 205 | 139 | 139 | 181 | 180 | 100 |
| 200 | 196 | 168 | 197 | 197 | 150 | 171 | 151 | 156 | 160 | 163 | 156 | 165 | 198 | 213 | 190 |
| 182 | 185 | 183 | 180 | 163 | 179 | 195 | 145 | 158 | 154 | 167 | 197 | 189 | 193 | 194 | 193 |
| 161 | 141 | 154 | 119 | 89  | 158 | 188 | 150 | 142 | 160 | 122 | 169 | 182 | 199 | 207 | 221 |
| 148 | 126 | 185 | 179 | 205 | 230 | 186 | 128 | 162 | 152 | 111 | 132 | 156 | 175 | 207 | 227 |
| 211 | 199 | 186 | 236 | 232 | 201 | 194 | 162 | 145 | 139 | 149 | 151 | 143 | 128 | 168 | 211 |
| 158 | 150 | 120 | 161 | 127 | 149 | 180 | 182 | 175 | 162 | 158 | 149 | 119 | 109 | 134 | 175 |
| 181 | 174 | 144 | 164 | 126 | 133 | 176 | 181 | 177 | 166 | 148 | 132 | 127 | 141 | 148 | 155 |
| 194 | 174 | 158 | 201 | 207 | 202 | 195 | 193 | 197 | 157 | 120 | 142 | 196 | 215 | 167 | 140 |

FIG. 3C

16x16 GREEN COLOR CHANNEL — 20

| 119 | 74 | 94 | 68 | 47 | 47 | 55 | 75 | 102 | 113 | 103 | 112 | 167 | 208 | 201 | 177 |
|---|---|---|---|---|---|---|---|---|---|---|---|---|---|---|---|
| 150 | 97 | 119 | 135 | 101 | 93 | 112 | 116 | 74 | 74 | 60 | 67 | 125 | 147 | 155 | 205 |
| 200 | 160 | 139 | 137 | 113 | 98 | 130 | 163 | 137 | 136 | 114 | 90 | 121 | 112 | 118 | 177 |
| 185 | 178 | 184 | 158 | 114 | 111 | 120 | 168 | 207 | 193 | 176 | 116 | 68 | 69 | 103 | 116 |
| 179 | 159 | 225 | 202 | 129 | 134 | 148 | 134 | 169 | 185 | 173 | 127 | 65 | 97 | 126 | 131 |
| 147 | 175 | 221 | 241 | 214 | 138 | 83 | 122 | 132 | 163 | 200 | 170 | 139 | 154 | 135 | 86 |
| 194 | 233 | 226 | 179 | 160 | 120 | 87 | 128 | 130 | 169 | 193 | 164 | 132 | 160 | 139 | 79 |
| 225 | 228 | 221 | 158 | 94 | 102 | 105 | 104 | 127 | 188 | 187 | 113 | 106 | 155 | 164 | 85 |
| 214 | 208 | 178 | 209 | 208 | 157 | 164 | 126 | 120 | 128 | 134 | 128 | 135 | 173 | 195 | 175 |
| 196 | 196 | 190 | 187 | 172 | 188 | 205 | 137 | 128 | 123 | 138 | 173 | 164 | 169 | 171 | 168 |
| 178 | 154 | 159 | 117 | 80 | 153 | 192 | 154 | 134 | 148 | 105 | 153 | 161 | 173 | 185 | 196 |
| 154 | 129 | 192 | 181 | 195 | 220 | 184 | 130 | 164 | 148 | 94 | 111 | 131 | 144 | 181 | 204 |
| 220 | 206 | 194 | 248 | 245 | 204 | 196 | 167 | 149 | 131 | 129 | 129 | 120 | 95 | 139 | 189 |
| 170 | 161 | 128 | 176 | 144 | 153 | 188 | 193 | 181 | 157 | 141 | 128 | 97 | 78 | 110 | 158 |
| 193 | 188 | 155 | 177 | 139 | 137 | 183 | 192 | 187 | 170 | 140 | 117 | 111 | 125 | 137 | 145 |
| 210 | 189 | 172 | 215 | 218 | 213 | 204 | 205 | 215 | 172 | 113 | 127 | 191 | 218 | 169 | 137 |

FIG. 3D

16x16 BLUE COLOR CHANNEL — 22

| 131 | 60  | 62  | 46  | 25  | 19  | 31  | 47  | 60  | 75  | 72  | 74  | 126 | 176 | 170 | 177 |
|-----|-----|-----|-----|-----|-----|-----|-----|-----|-----|-----|-----|-----|-----|-----|-----|
| 169 | 94  | 86  | 95  | 67  | 55  | 71  | 84  | 45  | 48  | 44  | 43  | 101 | 121 | 105 | 173 |
| 221 | 177 | 131 | 102 | 69  | 47  | 72  | 117 | 102 | 101 | 94  | 69  | 97  | 93  | 74  | 114 |
| 209 | 209 | 210 | 167 | 86  | 67  | 71  | 107 | 153 | 144 | 137 | 97  | 55  | 47  | 69  | 69  |
| 211 | 195 | 246 | 228 | 136 | 113 | 117 | 76  | 104 | 128 | 126 | 102 | 45  | 60  | 90  | 106 |
| 190 | 210 | 245 | 255 | 230 | 147 | 65  | 82  | 78  | 99  | 143 | 120 | 86  | 93  | 89  | 65  |
| 223 | 248 | 249 | 219 | 189 | 130 | 62  | 90  | 84  | 112 | 136 | 105 | 68  | 95  | 89  | 52  |
| 251 | 254 | 248 | 196 | 124 | 115 | 87  | 65  | 73  | 128 | 134 | 60  | 47  | 92  | 116 | 65  |
| 245 | 237 | 212 | 231 | 227 | 177 | 171 | 101 | 62  | 68  | 80  | 72  | 72  | 109 | 144 | 145 |
| 236 | 233 | 221 | 211 | 191 | 203 | 217 | 137 | 91  | 73  | 84  | 115 | 103 | 107 | 113 | 114 |
| 214 | 190 | 190 | 150 | 98  | 150 | 193 | 160 | 124 | 121 | 68  | 110 | 105 | 111 | 124 | 139 |
| 195 | 167 | 218 | 206 | 202 | 201 | 158 | 119 | 160 | 138 | 65  | 67  | 75  | 76  | 112 | 144 |
| 246 | 236 | 226 | 255 | 255 | 212 | 171 | 133 | 132 | 112 | 83  | 74  | 62  | 29  | 63  | 119 |
| 212 | 201 | 168 | 201 | 176 | 169 | 159 | 120 | 106 | 87  | 58  | 47  | 23  | 9   | 32  | 79  |
| 229 | 223 | 192 | 205 | 167 | 152 | 163 | 119 | 80  | 60  | 29  | 21  | 39  | 62  | 65  | 62  |
| 250 | 231 | 207 | 239 | 239 | 229 | 202 | 154 | 122 | 67  | 26  | 84  | 180 | 208 | 126 | 62  |

FIG. 4A

16x16 $Y_z$ CHANNEL

| 119 | 76 | 95 | 67 | 47 | 48 | 57 | 77 | 101 | 112 | 105 | 117 | 172 | 210 | 203 | 177 |
|---|---|---|---|---|---|---|---|---|---|---|---|---|---|---|---|
| 149 | 99 | 121 | 135 | 98 | 93 | 114 | 117 | 75 | 75 | 62 | 71 | 129 | 150 | 160 | 207 |
| 199 | 162 | 142 | 138 | 112 | 98 | 134 | 166 | 139 | 137 | 114 | 93 | 125 | 117 | 124 | 180 |
| 186 | 179 | 185 | 159 | 115 | 113 | 124 | 170 | 206 | 192 | 175 | 116 | 72 | 74 | 108 | 120 |
| 180 | 162 | 225 | 203 | 131 | 136 | 151 | 135 | 169 | 185 | 172 | 127 | 69 | 102 | 130 | 133 |
| 149 | 178 | 222 | 240 | 214 | 141 | 89 | 125 | 134 | 164 | 199 | 169 | 139 | 155 | 136 | 87 |
| 196 | 232 | 225 | 179 | 161 | 125 | 93 | 132 | 133 | 170 | 192 | 164 | 133 | 160 | 138 | 80 |
| 225 | 227 | 219 | 158 | 97 | 107 | 111 | 109 | 131 | 188 | 186 | 114 | 108 | 155 | 163 | 87 |
| 214 | 208 | 179 | 208 | 207 | 157 | 167 | 130 | 123 | 130 | 136 | 129 | 136 | 172 | 194 | 176 |
| 197 | 197 | 192 | 188 | 172 | 187 | 204 | 139 | 132 | 126 | 140 | 173 | 164 | 168 | 170 | 169 |
| 178 | 155 | 161 | 122 | 85 | 154 | 191 | 154 | 135 | 148 | 105 | 152 | 160 | 173 | 184 | 196 |
| 157 | 133 | 193 | 184 | 199 | 221 | 181 | 128 | 163 | 148 | 95 | 112 | 131 | 145 | 180 | 203 |
| 221 | 208 | 196 | 245 | 242 | 204 | 192 | 161 | 146 | 131 | 129 | 129 | 119 | 96 | 138 | 187 |
| 172 | 163 | 131 | 175 | 143 | 154 | 182 | 181 | 170 | 150 | 136 | 124 | 94 | 78 | 107 | 153 |
| 194 | 188 | 156 | 177 | 139 | 138 | 178 | 180 | 171 | 155 | 128 | 109 | 107 | 122 | 131 | 138 |
| 210 | 190 | 172 | 214 | 217 | 212 | 201 | 195 | 198 | 154 | 104 | 126 | 191 | 216 | 163 | 128 |

16x16 $U_z$ CHANNEL — 26

| 135 | 119 | 109 | 116 | 115 | 111 | 113 | 111 | 105 | 107 | 109 | 103 | 102 | 109 | 109 | 128 |
|---|---|---|---|---|---|---|---|---|---|---|---|---|---|---|---|
| 139 | 125 | 108 | 105 | 110 | 106 | 103 | 109 | 111 | 113 | 118 | 112 | 112 | 111 | 97 | 109 |
| 141 | 137 | 122 | 107 | 103 | 99 | 93 | 100 | 107 | 107 | 117 | 114 | 112 | 114 | 99 | 90 |
| 141 | 145 | 142 | 133 | 111 | 102 | 98 | 92 | 98 | 101 | 106 | 117 | 118 | 113 | 106 | 99 |
| 146 | 147 | 140 | 142 | 131 | 115 | 109 | 94 | 91 | 95 | 102 | 114 | 114 | 104 | 105 | 113 |
| 151 | 146 | 141 | 137 | 137 | 131 | 114 | 103 | 96 | 91 | 96 | 100 | 98 | 93 | 101 | 115 |
| 143 | 137 | 142 | 151 | 144 | 131 | 110 | 104 | 100 | 95 | 96 | 94 | 91 | 91 | 100 | 112 |
| 143 | 143 | 145 | 150 | 143 | 133 | 114 | 103 | 95 | 94 | 98 | 97 | 93 | 92 | 101 | 115 |
| 146 | 145 | 147 | 141 | 139 | 139 | 130 | 111 | 93 | 93 | 96 | 95 | 91 | 92 | 99 | 110 |
| 150 | 149 | 145 | 141 | 139 | 137 | 135 | 127 | 105 | 98 | 96 | 95 | 93 | 93 | 95 | 97 |
| 149 | 148 | 145 | 144 | 135 | 126 | 129 | 131 | 122 | 113 | 107 | 104 | 97 | 93 | 94 | 95 |
| 150 | 147 | 142 | 141 | 130 | 117 | 115 | 123 | 126 | 122 | 111 | 102 | 96 | 89 | 89 | 94 |
| 142 | 144 | 145 | 134 | 135 | 133 | 116 | 112 | 120 | 117 | 102 | 97 | 95 | 90 | 85 | 89 |
| 151 | 150 | 149 | 143 | 147 | 137 | 115 | 93 | 91 | 92 | 83 | 84 | 87 | 89 | 85 | 86 |
| 148 | 148 | 149 | 144 | 144 | 136 | 119 | 93 | 76 | 74 | 71 | 78 | 89 | 94 | 90 | 85 |
| 151 | 151 | 148 | 142 | 141 | 138 | 129 | 105 | 85 | 78 | 83 | 104 | 122 | 123 | 107 | 90 |

FIG. 4C

16x16 V$_z$ CHANNEL

| 125 | 135 | 139 | 133 | 133 | 137 | 139 | 139 | 138 | 137 | 139 | 146 | 147 | 141 | 140 | 128 |
|---|---|---|---|---|---|---|---|---|---|---|---|---|---|---|---|
| 121 | 131 | 141 | 139 | 133 | 139 | 143 | 139 | 139 | 137 | 137 | 141 | 141 | 141 | 150 | 141 |
| 121 | 126 | 135 | 140 | 138 | 143 | 151 | 146 | 142 | 139 | 133 | 138 | 141 | 141 | 151 | 151 |
| 123 | 121 | 123 | 128 | 139 | 144 | 149 | 149 | 143 | 140 | 137 | 134 | 138 | 143 | 145 | 149 |
| 121 | 122 | 122 | 121 | 129 | 138 | 141 | 147 | 147 | 144 | 141 | 135 | 140 | 147 | 145 | 139 |
| 120 | 123 | 122 | 123 | 123 | 131 | 143 | 145 | 147 | 148 | 143 | 140 | 144 | 147 | 143 | 137 |
| 123 | 122 | 120 | 117 | 122 | 134 | 145 | 146 | 147 | 145 | 143 | 145 | 149 | 146 | 141 | 138 |
| 120 | 119 | 117 | 117 | 123 | 131 | 142 | 147 | 149 | 146 | 141 | 145 | 149 | 145 | 139 | 137 |
| 119 | 120 | 121 | 121 | 121 | 123 | 131 | 142 | 150 | 148 | 146 | 146 | 147 | 145 | 141 | 137 |
| 118 | 120 | 122 | 123 | 122 | 123 | 122 | 132 | 145 | 147 | 146 | 144 | 145 | 145 | 144 | 144 |
| 117 | 119 | 123 | 126 | 131 | 131 | 126 | 125 | 133 | 136 | 139 | 139 | 143 | 145 | 143 | 145 |
| 122 | 123 | 123 | 125 | 132 | 134 | 131 | 128 | 127 | 131 | 139 | 141 | 145 | 148 | 146 | 144 |
| 121 | 122 | 121 | 122 | 121 | 126 | 129 | 129 | 127 | 133 | 141 | 143 | 144 | 149 | 148 | 144 |
| 119 | 119 | 121 | 119 | 117 | 125 | 127 | 129 | 131 | 136 | 143 | 145 | 145 | 149 | 146 | 143 |
| 119 | 119 | 120 | 119 | 119 | 125 | 127 | 129 | 132 | 135 | 141 | 143 | 141 | 141 | 139 | 139 |
| 117 | 117 | 119 | 119 | 121 | 121 | 124 | 127 | 127 | 129 | 139 | 139 | 131 | 127 | 131 | 135 |

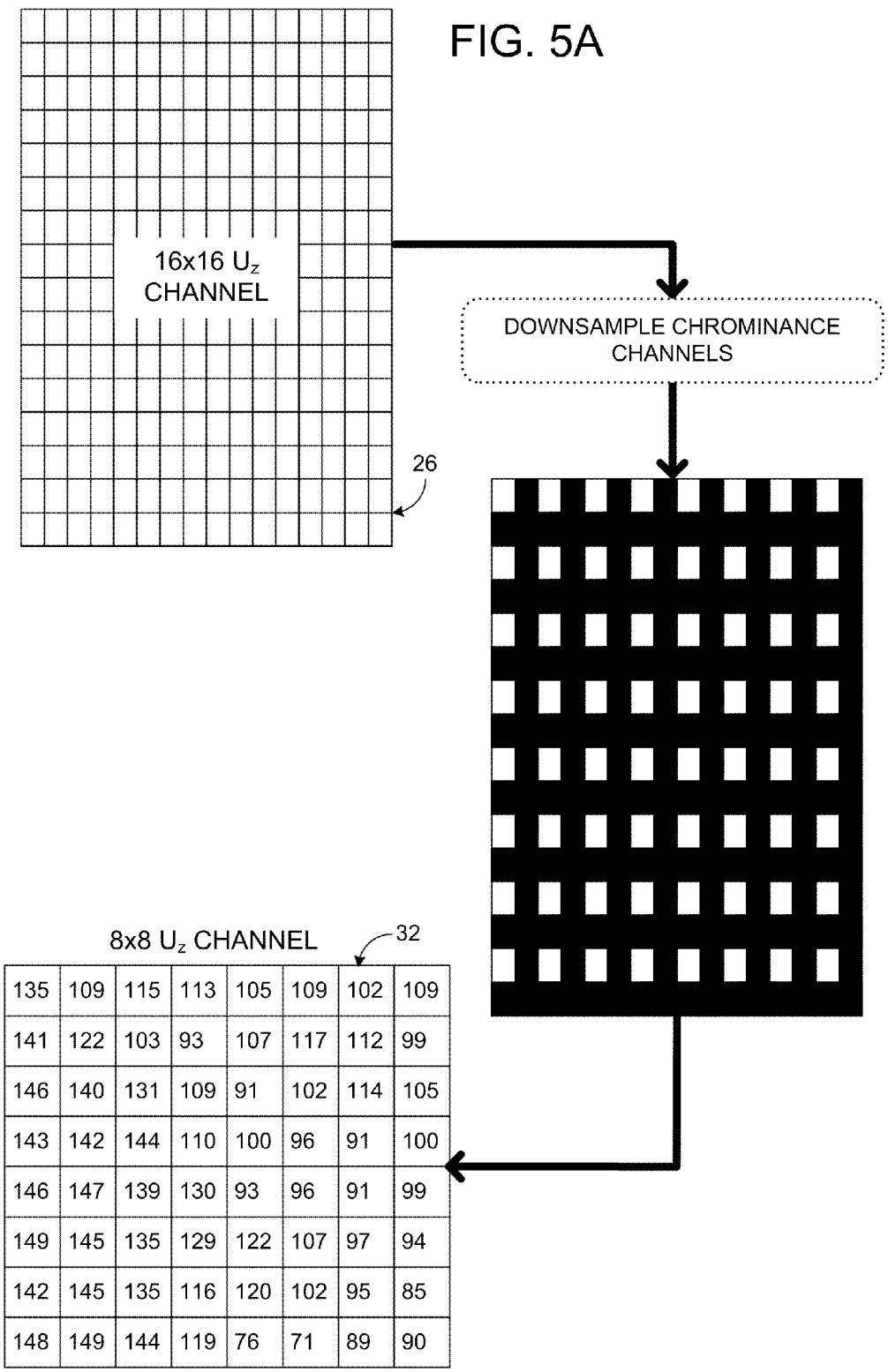

FIG. 8A $Y_z$ QUANTIZATION TABLE (50%)

| 16 | 11 | 10 | 16 | 24 | 40 | 51 | 61 |
|----|----|----|----|----|----|----|----|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

FIG. 8B $U_z$, $V_z$ QUANTIZATION TABLE (50%)

| 17 | 18 | 24 | 47 | 99 | 99 | 99 | 99 |
|----|----|----|----|----|----|----|----|
| 18 | 21 | 26 | 66 | 99 | 99 | 99 | 99 |
| 24 | 26 | 56 | 99 | 99 | 99 | 99 | 99 |
| 47 | 66 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |

FIG. 8C

ALPHA QUANTIZATION TABLE (50%)

| 16 | 16 | 18 | 22 | 30 | 40 | 50 | 60 |
|----|----|----|----|----|----|----|----|
| 16 | 17 | 20 | 25 | 32 | 44 | 55 | 66 |
| 18 | 20 | 22 | 28 | 35 | 48 | 60 | 72 |
| 22 | 25 | 28 | 34 | 38 | 52 | 65 | 78 |
| 30 | 32 | 35 | 38 | 40 | 56 | 70 | 84 |
| 40 | 44 | 48 | 52 | 56 | 60 | 75 | 90 |
| 50 | 55 | 60 | 65 | 70 | 75 | 80 | 96 |
| 60 | 66 | 72 | 78 | 84 | 90 | 96 | 102 |

FIG. 8D

DATA QUANTIZATION TABLE (50%)

| 10 | 10 | 12 | 15 | 20 | 28 | 38 | 48 |
|----|----|----|----|----|----|----|----|
| 10 | 11 | 14 | 17 | 22 | 30 | 41 | 51 |
| 12 | 14 | 16 | 19 | 25 | 32 | 44 | 54 |
| 15 | 17 | 19 | 21 | 29 | 35 | 47 | 57 |
| 20 | 22 | 25 | 29 | 32 | 39 | 51 | 61 |
| 28 | 30 | 32 | 35 | 39 | 43 | 55 | 65 |
| 38 | 41 | 44 | 47 | 51 | 55 | 60 | 70 |
| 48 | 51 | 54 | 57 | 61 | 65 | 70 | 76 |

DIGITAL IMAGE COMPRESSION AND DECOMPRESSION

BACKGROUND

Digital images are used for a variety of different purposes. Relatively large digital images, which have high resolutions, can occupy significant quantities of disc space. Therefore, digital compression techniques which can compress digital image data with only acceptable sacrifices in quality are beneficial.

SUMMARY

Accordingly, methods for compressing a digital image are disclosed. According to some aspects of the disclosure, a digital image is converted into a frequency-domain representation of the digital image. Before the conversion, an average of the values in each channel of the digital image is calculated and used to offset the input values to a frequency domain converter. According to another aspect of the disclosure, the frequency-domain representation of the digital image is quantized by a scaled quantization table that yields only quantized coefficients small enough to be represented using a predetermined number of bits.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3A shows the RGB components of an exemplary 16×16 digital image as represented in the RGB color space.

FIG. 3B shows the red color channel of the digital image of FIG. 3A.

FIG. 3C shows the green color channel of the digital image of FIG. 3A.

FIG. 3D shows the blue color channel of the digital image of FIG. 3A.

FIG. 4A shows a luminance channel as color-space converted from the RGB digital image of FIG. 3A.

FIG. 4B shows a first chrominance channel as color-space converted from the RGB digital image of FIG. 3A.

FIG. 4C shows a second chrominance channel as color-space converted from the RGB digital image of FIG. 3A.

FIG. 5A somewhat schematically shows downsampling the first chrominance channel of FIG. 4B in accordance with an embodiment of the present disclosure.

FIGS. 8A-8D show example channel-specific quantization tables in accordance with an embodiment of the present disclosure.

DETAILED DESCRIPTION

A codec for digital images is disclosed. The disclosed ZTC codec, as it is referred to herein, may be used for compressing and decompressing digital images for virtually any purpose. The ZTC codec is particularly well suited for compressing and decompressing textures and/or other digital images used in games or other computer-rendered virtual environments.

Games and other virtual-environment applications have drastically increased the amount and size of textures and images that are used to construct increasingly larger, more-complex, and/or more realistic virtual environments. Often times, the data used to represent such textures and images is transferred to local memory from a removable medium or from a remote server via a network, and this transfer can serve as a bottleneck in the rendering of the virtual environment. Accordingly, decreasing the amount of data used to represent the textures or images can mitigate, if not eliminate, the effects of such a bottleneck.

Furthermore, once transferred, the data is decompressed, which can be computationally expensive. Therefore, decompression calculations that are efficient on a given platform can further mitigate potential bottlenecks.

As described in more detail below, the ZTC codec tightly compresses data in a manner that facilitates fast, real-time, decompression. The ZTC codec is configured to handle standard image formats as well as reduced bit depth images, texture compression, alpha channels, normal maps, and arbitrary data images. The ZTC codec is believed to achieve tighter compression ratios than other known image codecs (e.g., JPEG) by at least 10-20%, especially at higher quality settings. Also, the ZTC codec is believed to achieve 33% tighter compression ratios than other texture compression formats on real game textures, for an overall ratio of about 1:25. It is believed that the ZTC codec may achieve approximately 1:100 compression ratios while maintaining a good level of quality.

Figure 1:
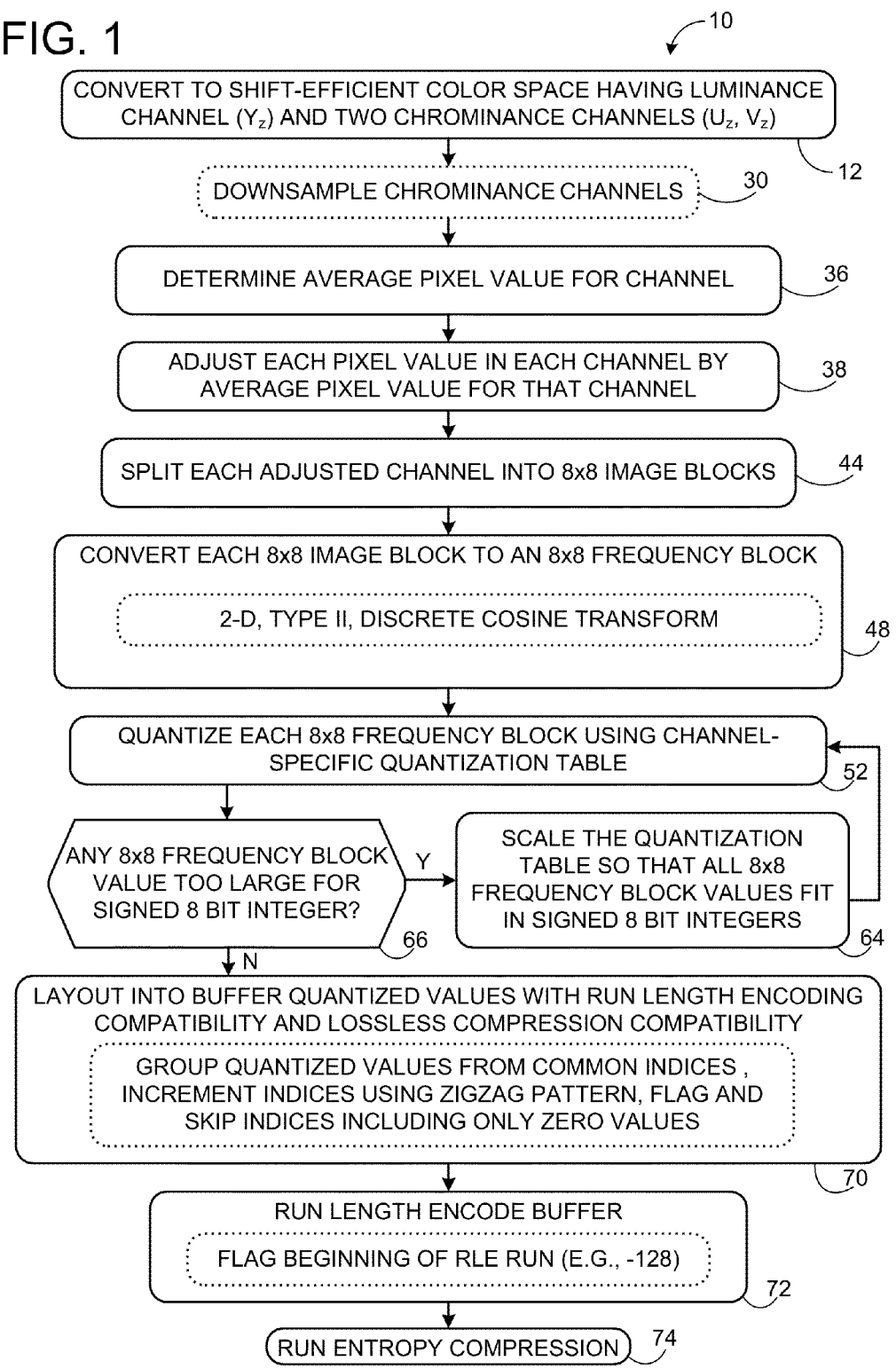
FIG. 1 shows an exemplary process flow for a digital image codec in accordance with an embodiment of the present disclosure.

FIG. 1 shows an example process flow 10 for the ZTC codec. The illustrated process flow includes various different methods for compressing a digital image defined by a plurality of pixel values in each of one or more channels. At 12, process flow 10 includes converting the digital image from one or more initial channels (e.g., RGB) to a shift-efficient color space having a luminance channel ($Y_z$), a first chrominance channel ($U_z$), and a second chrominance channel ($V_z$). The shift-efficient color space facilitates efficient decompression by eliminating multiplications and reducing bit shifts when compared to other color spaces, such as conventional YUV. Using bit shifts during decompression can increase performance and/or facilitate hardware execution of the algorithm.

As the luminance channel ($Y_z$), the first chrominance channel ($U_z$), and the second chrominance channel ($V_z$) are constituent elements of the shift-efficient color space, the RGB color space includes a red color channel ($R_I$), a green color channel ($G_I$), and a blue color channel ($B_I$).

Conversions from the RGB color space to the shift-efficient color space can be performed using the following calculations (e.g., as an initial step of compression):

$$Y_z = \frac{21}{72}R_I + \frac{21}{36}G_I + \frac{63}{504}B_I$$

$$U_z = \frac{4}{7}(B_I - Y_z) + 128$$

$$V_z = \frac{2}{3}(R_I - Y_z) + 128.$$

Conversions from the shift-efficient color space back to the RGB color space can be performed using the following calculations (e.g., after compression as part of decompression):

$$U_z = U_z - 128$$

$$V_z = V_z - 128$$

$$R_I = Y_z + (((V_z<<1) + V_z + (1<<0))>>1)$$

$$G_I = Y_z - ((((U_z<<1) + U_z) + ((V_z<<2) + (V_z<<1)) + (1<<2))>>3)$$

$$B_I = Y_z + (((U_z<<3) - U_z + (1<<1))>>2)$$

As can be seen above, the shift-efficient color space is configured to convert back to the RGB color space without multiplications and with four or fewer bit shifts for each color channel.

Figure 2:
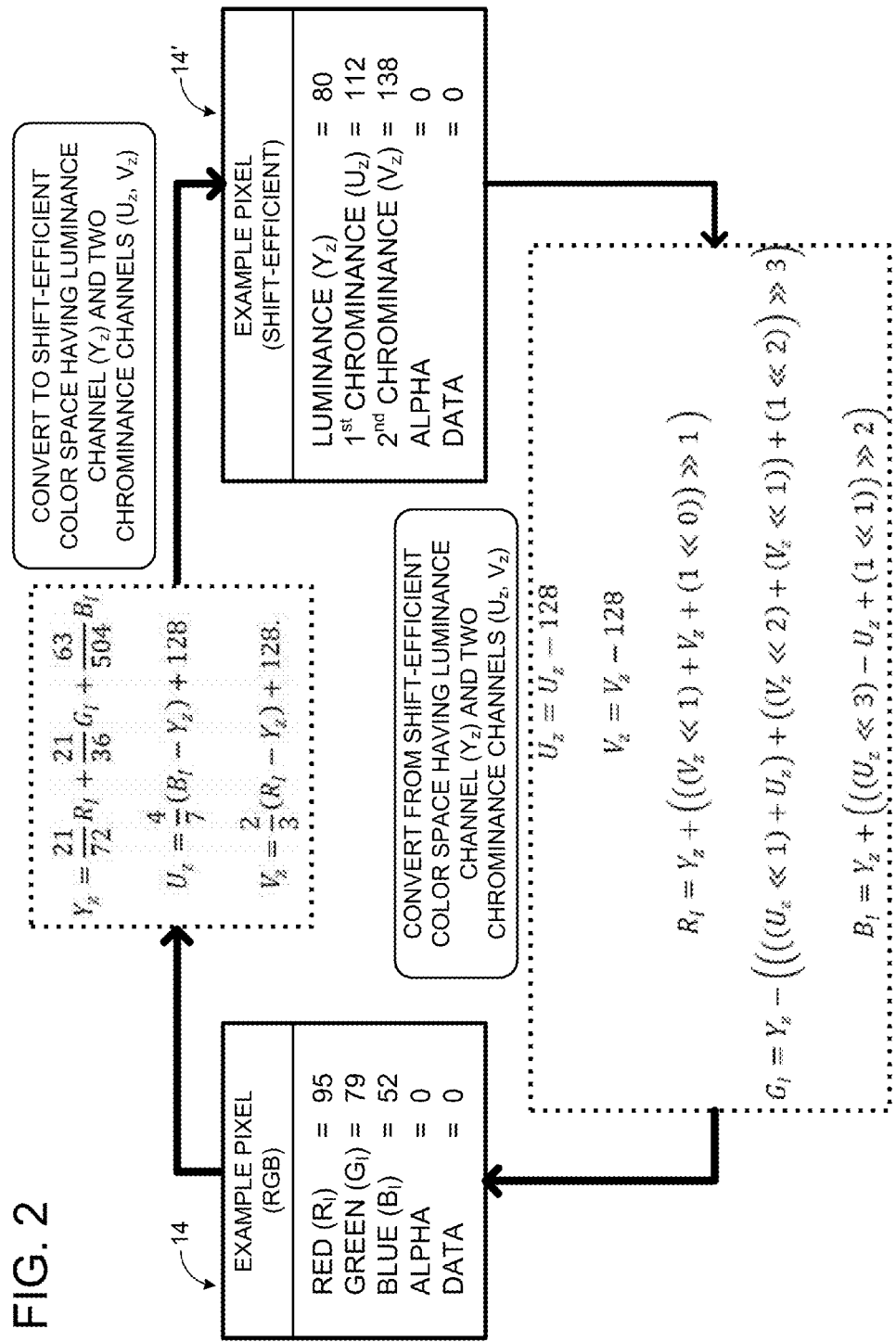
FIG. 2 somewhat schematically shows color space conversion between an RGB color space and a shift-efficient color space in accordance with an embodiment of the present disclosure.

FIG. 2 schematically shows conversions between the RGB color space and the shift-efficient color space. An example pixel 14 of a digital image as represented in the RGB color space and a corresponding example pixel 14' as represented in the shift-efficient color space is shown. Pixel 14 may include a red value, a green value, a blue value, and optionally an alpha value, a data image value, and/or one or more other values (not shown or described for simplification). Pixel 14' may include a luminance value, a first chrominance value, a second chrominance value, and optionally an alpha value, a data image value, and/or one or more other values (not shown). While shown using the exemplary color conversion equations described above, it is to be understood that other color conversion equations that provide a shift-efficient color space are within the spirit of this disclosure.

FIG. 2 shows only a single pixel of a digital image. However, digital images may include virtually any number of pixels, with more pixels resulting in more detailed, high-resolution images. For purposes of simplicity, the following disclosure will use a 16×16 image as an example.

FIG. 3A shows an example 16×16 image 16 as represented in the RGB color space. The image includes a pixel matrix having eight rows and eight columns for a total of 256 pixels. In this disclosure, the left-most column is identified with an index of 0, and the right-most column is identified with an index of 7, with all intermediate columns being incremented accordingly (i.e., 0, 1, 2, 3, 4, 5, 6, 7 from left to right). Similarly, the upper-most row is identified with an index of 0, and the lower-most row is identified with an index of 7, with all intermediate rows being incremented accordingly (i.e., 0, 1, 2, 3, 4, 5, 6, 7 from top to bottom). As such, the top left pixel can be identified as Pixel [0,0], for example. This convention is used throughout this disclosure.

Each pixel in FIG. 3A includes a red value (top value in cell), a green value (middle value in cell), and a blue value (bottom value in cell). As an example, Pixel [0, 0] includes a red value of 115, a green value of 119, and a blue value of 131. For purposes of simplicity, alpha values, data values, and all other pixel values are not shown in FIG. 3A.

As shown in FIGS. 3B-3D, the pixel values from the various color channels can be isolated with other pixel values from the same channel. For example, FIG. 3B shows a red color channel 18 corresponding to image 16 from FIG. 3A. Likewise, FIG. 3C shows a green color channel 20, and FIG. 3D shows a red color channel 22.

FIGS. 4A-4C respectively show a luminance channel 24, a first chrominance channel 26, and a second chrominance channel 28, as converted from image 16 from FIG. 3A using the above described color conversion equations.

Turning back to FIG. 1, at 30, process flow 10 optionally includes downsampling the first chrominance channel and the second chrominance channel. As used herein, downsampling is used to refer to any technique that effectively reduces the amount of information in a channel. As nonlimiting examples, downsampling may include subsampling, averaging, filtering, and/or binning. Downsampling may be executed to virtually any extent without departing from the spirit of this disclosure. It is believed that a 2×2 reduction is appropriate in many situations (e.g., downsampling a 16×16 channel to a 8×8 channel).

Downsampling reduces the total data required to describe an image. Because human eyes are much better at detecting changes in luminance as opposed to changes in color, the chrominance channels can be downsampled without significantly affecting how a human will perceive an image. When decompressing the image, the chrominance channels can be upsampled using any desired technique to facilitate color conversion back to the RGB color space.

Figure 5B:
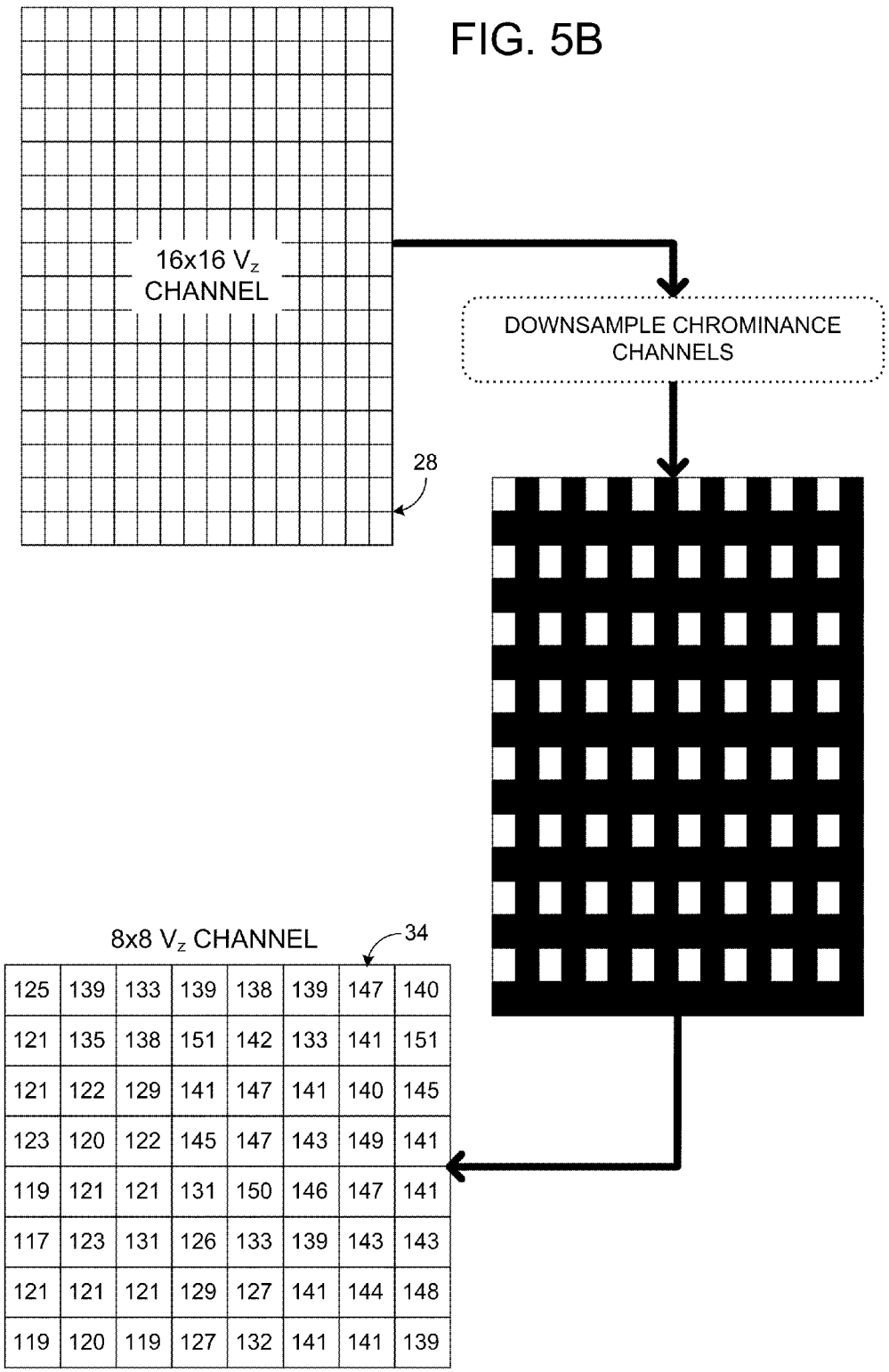
FIG. 5B somewhat schematically shows downsampling the second chrominance channel of FIG. 4C in accordance with an embodiment of the present disclosure.

Continuing with the example started with FIG. 3A, FIG. 5A shows a downsampled, 8×8 first chrominance channel 32, and FIG. 5B shows a downsampled, 8×8 second chrominance channel 34. In the illustrated embodiment, the color channels are subsampled by skipping every-other column and every-other row of chrominance values.

Turning back to FIG. 1, at 36, process flow 10 includes determining an average pixel value for the luminance channel, an average pixel value for the first chrominance channel, and an average pixel value for the second chrominance channel. As explained below, each channel is separately transformed into a frequency-domain representation of the channel (e.g., using a two-dimensional, type II, discrete cosine transform). Before applying the discrete cosine transform to each channel, the average of all pixels for a given channel may be taken and used to center the cosine transform to enable better compression for low contrast or lower bit images. In other words, image statistics are used to calculate a suitable offset for the cosine transformation. As a non-limiting example, image statistics can be taken of the whole image or a suitable subregion (e.g., a 32×32 block) and used to offset a discrete cosine transform. Offsetting the discrete cosine transform enables better compression overall for lower contrast or lower bit-per-pixel images and/or regions of images. As an example, the average of first chrominance channel 32 from FIG. 5A is 115.

Figure 6:
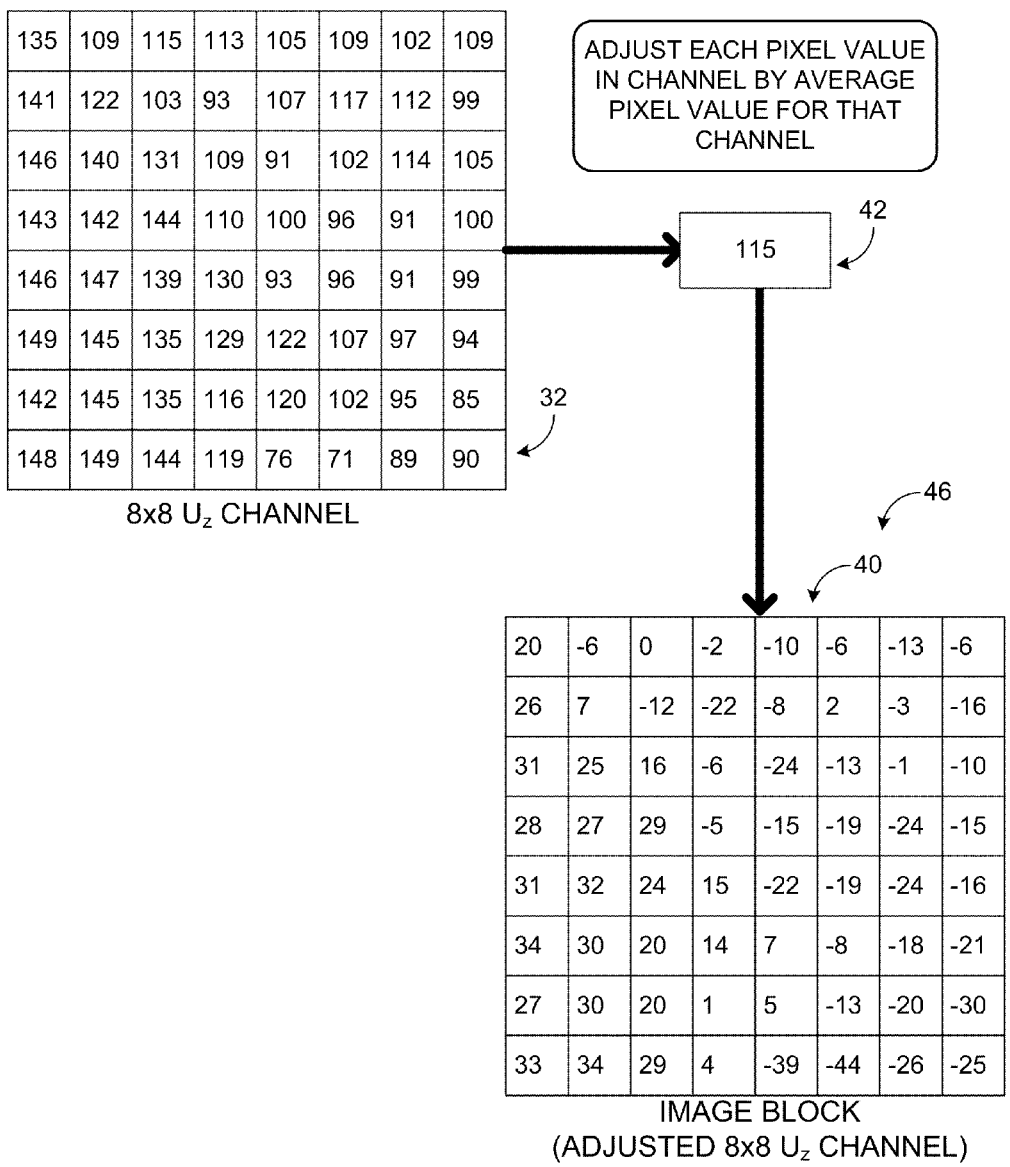
FIG. 6 somewhat schematically shows adjusting each pixel value in a channel by the average pixel value for that channel in accordance with an embodiment of the present disclosure.

At 38 of FIG. 1, process flow 10 includes adjusting each pixel value in each of one or more channels (e.g., $Y_z$, $U_z$, and $V_z$) by an average pixel value for that channel. In other words, the average pixel value for all pixel values in a channel may be individually subtracted from each pixel value in that channel. Continuing with the example of FIG. 5A, FIG. 6 shows an adjusted first chrominance channel 40 in which each subsampled chrominance value of first chrominance channel 32 is reduced by the average value 42 (e.g., 115) of the first chrominance channel 32.

Turning back to FIG. 1, at 44, process flow 10 includes splitting each adjusted channel into one or more image blocks. As a nonlimiting example, each channel may be operatively split into one or more 8×8 matrices, depending on the overall size of the channel. The 16×16 luminance channel 24 of FIG. 4A may be split into four 8×8 matrices (after adjustment), and the adjusted 8×8 first chrominance channel 40 of FIG. 6 may be split into one 8×8 matrix. That is, because adjusted first chrominance channel 40 is already an 8×8 matrix, the adjusted first chrominance channel is an image block 46. As explained in more detail below, splitting each channel into one or more image blocks (e.g., 8×8 image blocks) facilitates downstream processing, including conversion into a frequency-domain representation of the image block.

Figure 7:
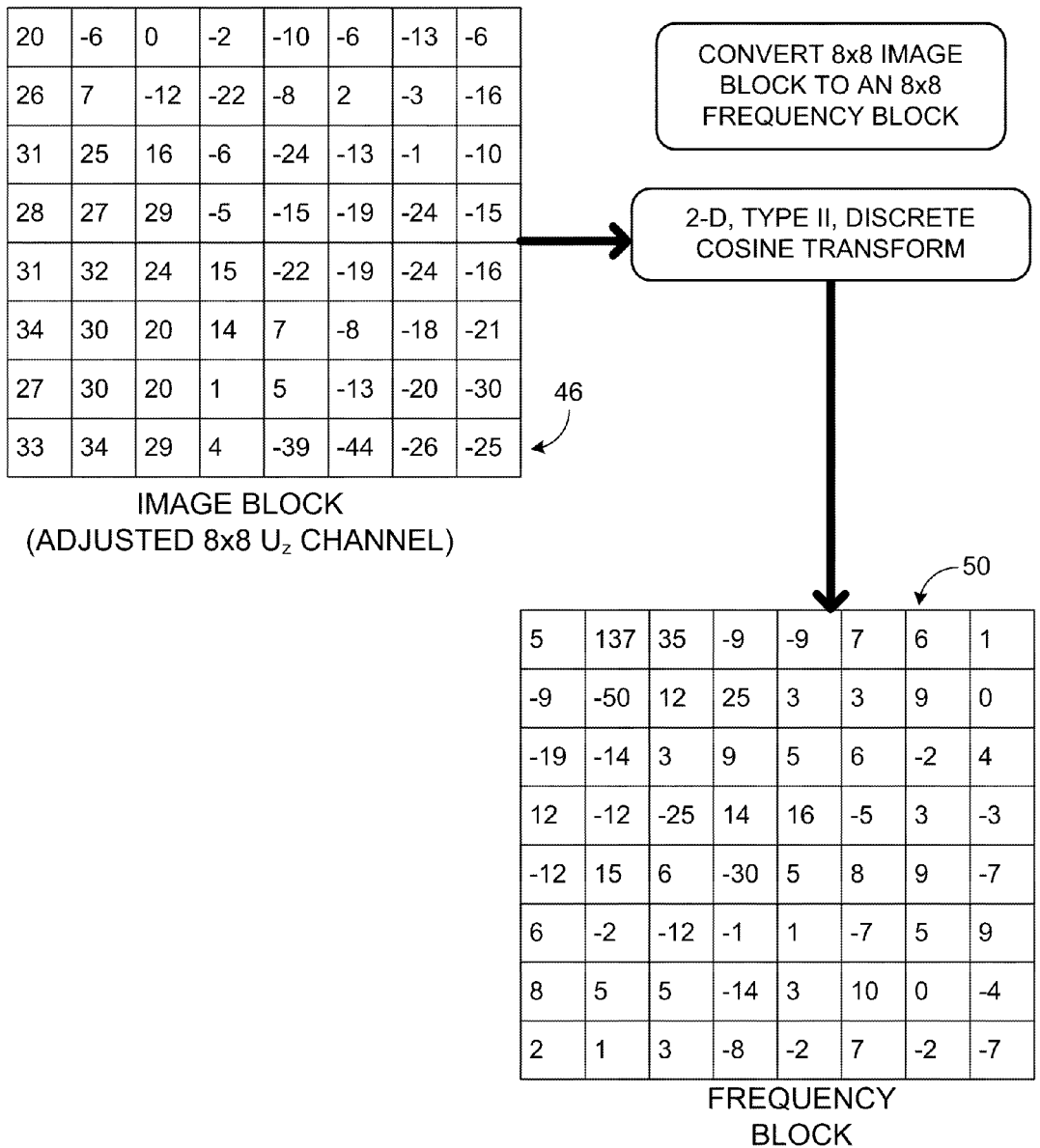
FIG. 7 somewhat schematically shows converting an 8×8 image block to an 8×8 frequency block in accordance with an embodiment of the present disclosure.

At 48 of FIG. 1, process flow 10 includes converting each image block into a frequency block that is a frequency-domain representation of that image block. As one example, this may include performing a two-dimensional, type II, discrete cosine transform on each image block (e.g., each 8×8 image block). FIG. 7 shows an example frequency block 50 transformed from image block 46 of FIG. 6 using a two-dimensional, type II, discrete cosine transform.

Transforming the image block into a frequency block facilitates data compression. In particular, after the transformation, the low frequency components of the image reside in the upper-left corner of the matrix (e.g., Pixel [0, 0]). The high frequency components reside in the lower-right corner of the matrix (e.g., Pixel [7, 7]). Because the low frequency components are more noticeable to a human eye, the high frequency information can be compressed and/or eliminated without affecting overall image quality to the same extent as if the low frequency information were eliminated.

Accordingly, at 52 of FIG. 1, process flow 10 includes quantizing each frequency block into a quantized block including a plurality of quantized coefficients using channel-specific quantization tables, which may be scaled, as described below. Each 8×8 frequency block may be quantized using one of four specific quantization tables. FIG. 8A shows an example luminance-channel quantization table 54 at 50% quality; FIG. 8B shows an example chrominance-channel quantization table 56 at 50% quality; FIG. 8C shows an example alpha-channel quantization table 58 at 50% quality; and FIG. 8D shows an example data-image quantization table 60 at 50% quality.

The quality of these tables may be set on a 0-100% sliding scale, according to the following algorithm:

```
{
if (iQuality < 1)
    iQuality = 1;
if (iQuality > 99)
    iQuality = 99;
double q =
    (iQuality < 50) ? (5000.0/(double)iQuality) : (200.0 - 2.0*iQuality);
for (INT i=0; i<TABLE_SIZE; i++)
    {
    pTableOut[i] = (int)(((double)pTableIn[i] * q + 50.0) / 100.0);
    if (pTableOut[i] == 0) pTableOut[i] = 1;
    if (pTableOut[i] > 255) pTableOut[i] = 255;
    }
}.
```

Quantization is carried out by dividing each component in the frequency block by a corresponding value for that component from the relevant quantization table and rounding to the nearest integer. Quantization may result in many of the higher frequency components being rounded to zero, and many of those components that are not rounded to zero being rounded to small positive or negative numbers, which take relatively fewer bits to store.

Figure 9:
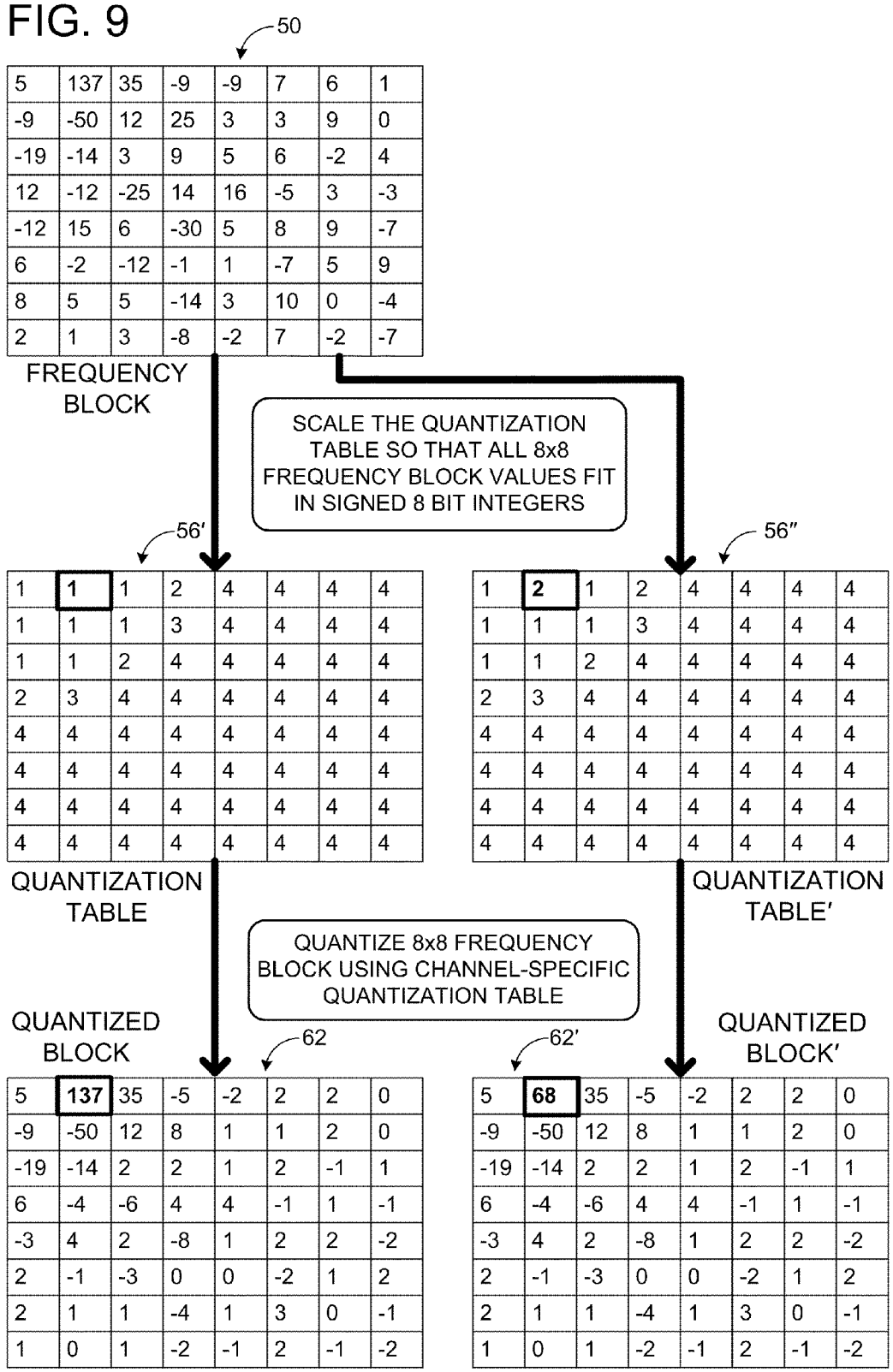
FIG. 9 somewhat schematically shows quantizing an 8×8 frequency block using a scaled, channel-specific quantization table in accordance with an embodiment of the present disclosure.

FIG. 9 shows an example in which a 98% quality chrominance-channel quantization table 56' is applied to frequency block 50 from FIG. 7. The quantization results in a quantized block 62. As can be seen in this example, much of the high frequency information is reduced or eliminated via quantization.

Returning briefly to FIG. 1, at 64, process flow 10 includes scaling a channel-specific quantization table for each channel to yield only quantized coefficients small enough to be represented using a predetermined number of bits (e.g., a signed 8 bit number) when the channel-specific quantization table is applied to frequency blocks for that color channel.

As shown at 66 of FIG. 1, scaling the channel-specific quantization table for each channel may include testing a default channel-specific quantization table for each channel to determine if the default channel-specific quantization table yields only quantized coefficients small enough to be represented using the predetermined number of bits. If the default channel-specific quantization table yields only quantized coefficients small enough to be represented using the predetermined number of bits, then the default channel-specific quantization table can be used for that channel. If the default channel-specific quantization table does not yield only quantized coefficients small enough to be represented using the predetermined number of bits, then any transformation coefficients from the default channel-specific quantization table that yield quantized coefficients too large to be represented using a predetermined number of bits can be adjusted to form an updated channel-specific quantization table. The updated channel-specific quantization table can then be used for that channel.

Such table scaling may be carried out using the following algorithm:

```
for (DWORD i=0; i<ZTC_DCT_BLOCK; i++)
{
if ((minDct[i]/QuantTable[i]) < -127 || (maxDct[i]/QuantTable[i]) > 127)
    {
    QuantTable[i] = (max(abs(minDct[i]), abs(maxDct[i]))/127) + 1;
    }
}.
```

In other words, all values in the quantization table are incremented sufficiently large enough to result in corresponding quantized coefficients that are a desired size.

Returning to FIG. 9, Quantized Coefficient [1, 0] of quantized block 62 is 137, and thus cannot be represented using a signed 8 bit number. As a result, quantization table 56' is scaled to quantization table 56" by changing Value [0, 1] from 1 to 2. As a result, quantized block 62' has a Quantized Coefficient [1, 0] of 68, which can be represented by a signed 8 bit number. Because all quantized coefficients of quantized block 62' can be represented by a signed 8 bit number, no further scaling is carried out.

Returning to FIG. 1, at 70, process flow 10 includes progressively outputting a buffer of quantized coefficients having a same index in each quantized block. In other words, all of the [0, 0] quantized coefficients from all of the 8×8 quantized blocks of a color channel are output into a buffer, in a progressive sequence, and then all of the [0, 1] quantized coefficients are appended to the sequence of the [0, 0] quantized coefficients.

The quantized coefficients may be progressively output in a zig-zag order starting with low-frequency quantized coefficients and incrementing to high-frequency quantized coefficients. For example, the quantized coefficients may be output in the following order: [0, 0], [0, 1], [1, 0], [2, 0], [1, 1], [0, 2], [0, 3], [1, 2], [2, 1], [3, 0], [4, 0], . . . [5, 7], [6, 7], [7,6], [7,7].

If all commonly indexed values from all quantized blocks have a zero value, those zero values can be effectively skipped. Such a sequence of zeroes can be flagged and not included in the buffer stream. Single bit alpha channels may be treated differently. The 8 bit original alpha may be converted to 1 bit using thresholding, error diffusion, patterns, or by other suitable technique, and packed in a bit-field.

Quantized coefficients output as described above are compatible with run length encoding and/or lossless compression. At 72 of FIG. 1, process flow 10 includes run length encoding the buffer. The buffer may be compressed by using an marker (e.g., "−128") as the start of a run of at least three consecutive equal values. In such cases, the next value after the marker is the length, followed by the value to be repeated. For example, the following sequence may be run length encoded as indicated:   [−1][0][0][1][1][1][1][0]→RLE→[−1][0][0][−128][4][1][0]. This method prevents the final RLE'd data from growing.

While the above quantization has been described only with respect to the first chrominance channel, it is to be understood that each channel may be similarly processed.

This process results in run length encoded, progressively quantized coefficients for each channel, along with some header information (e.g., number of channels, type of channels, quantization table per channel, width, height, magic value, etc.). This format can be further compressed with virtually any entropy codec, as indicated at 74 of FIG. 1. Because games and other virtual environment applications often use lossless entropy codecs to compress all data on the disc or streamed via the network, the same lossless codec that is used to compress the other data can be used to compress the ZTC image data. In essence, this allows the ZTC image data to be compressed without paying the computational cost of an additional lossless decoding step present in other image compression codecs. However, the data provided by ZTC optionally may be further compressed with a lossless codec to achieve even tighter compression ratios.

When using the above described ZTC codec, a natural texture streaming pipeline can be built for run-time mip-map generation. It is believed that generating mip-maps during run-time may save an additional 33% of space.

While the ZTC codec has been described with respect to image compression, those skilled in the art of image compression and decompression will appreciate that the data resulting from the above described compression process may be decompressed by reversing the steps described above.

Figure 10:
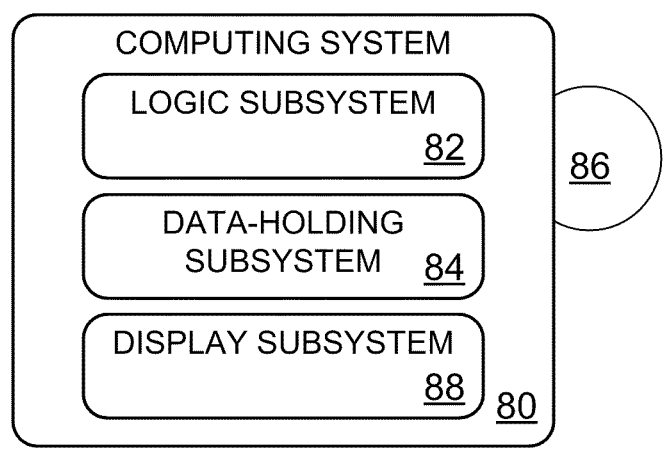
FIG. 10 shows an example computing system configured to execute the digital image codec illustrated in FIG. 1.

In some embodiments, the above described methods and processes may be tied to a computing system. As an example, FIG. 10 schematically shows a computing system 80 that may perform one or more of the above described methods and processes. Computing system 80 includes a logic subsystem 82 and a data-holding subsystem 84. Computing system 80 may optionally include a display subsystem and/or other components not shown in FIG. 10.

Logic subsystem 82 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Data-holding subsystem 84 may include one or more physical devices configured to hold data and/or instructions executable by the logic subsystem to implement the herein described methods and processes. When such methods and processes are implemented, the state of data-holding subsystem 84 may be transformed (e.g., to hold different data). Data-holding subsystem 84 may include removable media and/or built-in devices. Data-holding subsystem 84 may include optical memory devices, semiconductor memory devices, and/or magnetic memory devices, among others. Data-holding subsystem 84 may include devices with one or more of the following characteristics: volatile, nonvolatile, dynamic, static, read/write, read-only, random access, sequential access, location addressable, file addressable, and content addressable. In some embodiments, logic subsystem 82 and data-holding subsystem 84 may be integrated into one or more common devices, such as an application specific integrated circuit or a system on a chip.

FIG. 10 also shows an aspect of the data-holding subsystem in the form of computer-readable removable media 86, which may be used to store and/or transfer data and/or instructions executable to implement the herein described methods and processes.

When included, display subsystem 88 may be used to present a visual representation of data held by data-holding subsystem 84 (e.g., an uncompressed digital image or texture). As the herein described methods and processes change the data held by the data-holding subsystem, and thus transform the state of the data-holding subsystem, the state of display subsystem 88 may likewise be transformed to visually represent changes in the underlying data (e.g., a compressed digital image or texture). Display subsystem 88 may include one or more display devices utilizing virtually any type of technology. Such display devices may be combined with logic subsystem 82 and/or data-holding subsystem 84 in a shared enclosure, or such display devices may be peripheral display devices.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of compressing a digital image defined by a plurality of pixel values in each of one or more channels, the method comprising:
    splitting each channel into one or more image blocks;
    converting each image block into a frequency block that is a frequency-domain representation of that image block;
    scaling a channel-specific quantization table for each channel to yield only quantized coefficients small enough to be represented using a predetermined number of bits when the channel-specific quantization table is applied to frequency blocks for that color channel; and
    quantizing each frequency block into a quantized block including a plurality of quantized coefficients using the channel-specific quantization tables.

2. The method of claim 1, where scaling the channel-specific quantization table for each channel includes testing a default channel-specific quantization table for each channel to determine if the default channel-specific quantization table yields only quantized coefficients small enough to be represented using the predetermined number of bits; and
    if the default channel-specific quantization table yields only quantized coefficients small enough to be represented using the predetermined number of bits, then using the default channel-specific quantization table for that channel; or
    if the default channel-specific quantization table does not yield only quantized coefficients small enough to be represented using the predetermined number of bits, then adjusting any transformation coefficients from the default channel-specific quantization table that yielded quantized coefficients too large to be represented using a predetermined number of bits to form an updated channel-specific quantization table, and using the updated channel-specific quantization table for that channel.

3. The method of claim 1, where the one or more channels are constituent elements of a shift-efficient color space having a luminance channel, a first chrominance channel, and a second chrominance channel; and where the method further includes converting the digital image from an RGB color space to the shift-efficient color space.

4. The method of claim 3, where the RGB color space includes a red color channel ($R_I$), a green color channel ($G_I$), and a blue color channel ($B_I$), and where the luminance channel ($Y_z$) is converted as:

$$Y_z = \frac{21}{72}R_I + \frac{21}{36}G_I + \frac{63}{504}B_I$$

the first chrominance channel ($U_z$) is converted as:

$$U_z = \frac{4}{7}(B_I - Y_z) + 128$$

and the second chrominance channel ($V_z$) is converted as:

$$V_z = \frac{2}{3}(R_I - Y_z) + 128.$$

5. The method of claim 3, further comprising determining an average pixel value for the luminance channel, an average pixel value for the first chrominance channel, and an average pixel value for the second chrominance channel, and adjusting each pixel value in each channel by the average pixel value for that channel before converting each image block into a frequency block.

6. The method of claim 1, where converting each image block into a frequency block that is a frequency-domain representation of that image block includes performing a two-dimensional, type II, discrete cosine transform on each image block.

7. A method of compressing a digital image defined by a plurality of pixel values in each of one or more initial channels, the method comprising:
    converting the digital image from the one or more initial channels to a shift-efficient color space having a luminance channel, a first chrominance channel, and a second chrominance channel;
    downsampling the first chrominance channel and the second chrominance channel;
    determining an average pixel value for the luminance channel, an average pixel value for the first chrominance channel, and an average pixel value for the second chrominance channel;
    adjusting each pixel value in each channel by the average pixel value for that channel;
    splitting each channel, as adjusted, into one or more image blocks;
    converting each image block into a frequency block that is a frequency-domain representation of that image block;
    scaling a channel-specific quantization table for each channel to yield only quantized coefficients small enough to be represented using a predetermined number of bits when the channel-specific quantization table is applied to frequency blocks for that color channel; and
    quantizing each frequency block into a quantized block including a plurality of quantized coefficients using the channel-specific quantization tables.

8. The method of claim 7, where the one or more initial channels includes a red color channel ($R_I$), a green color channel ($G_I$), and a blue color channel ($B_I$);
    where the luminance channel ($Y_z$) is converted as:

$$Y_z = \frac{21}{72}R_I + \frac{21}{36}G_I + \frac{63}{504}B_I$$

where the first chrominance channel ($U_z$) is converted as:

$$U_z = \frac{4}{7}(B_I - Y_z) + 128$$

and where the second chrominance channel ($V_z$) is converted as:

$$V_z = \frac{2}{3}(R_I - Y_z) + 128.$$

9. The method of claim 7, where the shift-efficient color space is configured to convert to a RGB color space without multiplications and with five or fewer bit shifts for each color channel.

10. The method of claim 7, where downsampling the first chrominance channel and the second chrominance channel includes one or more of subsampling, averaging, filtering, and binning.

11. The method of claim 7, where splitting each channel, as adjusted, into one or more image blocks includes splitting each channel into one or more 8×8 matrices.

12. The method of claim 7, where converting each image block into a frequency block that is a frequency-domain representation of that image block includes performing a two-dimensional, type II, discrete cosine transform on each image block.

13. The method of claim 7, further comprising progressively outputting a buffer of quantized coefficients having a same index in each quantized block, the quantized coefficients being progressively output in a zig-zag order starting with low-frequency quantized coefficients and incrementing to high-frequency quantized coefficients while skipping quantized coefficients having a zero value if all commonly indexed values from all quantized blocks also have a zero value.

14. The method of claim 13, further comprising run length encoding the buffer.

* * * * *